United States Patent
Cho et al.

(10) Patent No.: US 7,246,955 B2
(45) Date of Patent: Jul. 24, 2007

(54) AUTOMATIC CAMERA LENS MODULE RETRACTING/EXTENDING APPARATUS FOR MOBILE COMMUNICATION TERMINALS

(75) Inventors: Jin-Hee Cho, Suwon-si (KR); Sang-Gook Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 39 days.

(21) Appl. No.: 11/040,876

(22) Filed: Jan. 12, 2005

(65) Prior Publication Data

US 2005/0220451 A1    Oct. 6, 2005

(30) Foreign Application Priority Data

Apr. 2, 2004    (KR) ................. 10-2004-0022905

(51) Int. Cl.
   *G03B 5/02*    (2006.01)
(52) U.S. Cl. ..................... 396/349; 348/374
(58) Field of Classification Search ............. 396/349, 396/144, 348, 328–329; 348/373–376, 335, 348/345, 359, 445, 14.02; 359/694, 819, 359/822
   See application file for complete search history.

(56) References Cited

U.S. PATENT DOCUMENTS

| | | | |
|---|---|---|---|
| 4,448,496 A | | 5/1984 | Isobe et al. |
| 4,748,466 A | * | 5/1988 | Yamada et al. ............. 396/73 |
| RE34,453 E | | 11/1993 | Kamitani et al. |
| 5,832,326 A | * | 11/1998 | Tanaka ..................... 396/349 |
| 6,049,432 A | * | 4/2000 | Machida et al. ........... 359/700 |
| 6,222,684 B1 | * | 4/2001 | Nishimura ................. 359/740 |
| 2003/0164895 A1 | | 9/2003 | Viinikanoja et al. |

FOREIGN PATENT DOCUMENTS

| | | |
|---|---|---|
| GB | 2 389 988 | 12/2003 |
| JP | 10075287 | 3/1998 |
| JP | 2003309756 | 10/2003 |

* cited by examiner

*Primary Examiner*—Rodney Fuller
*Assistant Examiner*—Robert Do
(74) *Attorney, Agent, or Firm*—The Farrell Law Firm (57) ABSTRACT

An automatic camera lens module retracting/extending apparatus for mobile communication terminals converts rotating movement of a driving motor into rectilinear movement to automatically retract/extend a camera lens module into/from a mobile communication terminal including a lens housing extending a predetermined length in the longitudinal direction thereof, and a lens cam assembly to accommodate the lens housing therein, the lens cam assembly converting rotating movement of a driving motor into rectilinear movement to automatically retract/extend the lens housing into/from the lens cam assembly in the longitudinal direction of the lens housing. The lens housing is automatically rotated about a rotating axis of the lens housing by means of the lens cam assembly when the lens housing extends from the lens cam assembly.

9 Claims, 11 Drawing Sheets

AUTOMATIC CAMERA LENS MODULE RETRACTING/EXTENDING APPARATUS FOR MOBILE COMMUNICATION TERMINALS

PRIORITY

This application claims priority to an application entitled "AUTOMATIC CAMERA LENS MODULE RETRACTING/PROTRUDING APPARATUS FOR MOBILE COMMUNICATION TERMINALS," filed in the Korean Intellectual Property Office on Apr. 2, 2004 and assigned Serial No. 2004-22905, the contents of which are incorporated herein by reference.

BACKGROUND OF THE INVENTION

1. Field of the Invention

The present invention relates to an automatic camera lens module retracting/extending apparatus for mobile communication terminals, and more particularly to an automatic camera lens module retracting/extending apparatus for mobile communication terminals that automatically retracts/extends a camera lens module into/from a mobile communication terminal.

2. Description of the Related Art

Generally, the phrase "portable communication devices" means electronic devices that are portable and enable owners of the devices to communicate through wireless communication. Such portable communication devices have become increasingly small, slim, and lightweight, whereby portability thereof is improved. Furthermore, such portable communication devices are capable of multimedia transmission, whereby the devices have various additional functions. Future portable communication devices will be even more miniaturized, lightweight, multipurpose devices with various functions, which will be easily adapted to various multimedia and Internet environments. The portable communication devices are electronic devices commonly used by people of all ages and both sexes all over the world, and are considered a necessity of life.

On the basis of their forms, the portable communication devices may be classified into several types of communication devices. For example, the portable communication devices may be classified into a bar-type communication device, a flip-type communication device, and a folder-type communication device. The bar-type communication device includes a bar-type single housing, the flip-type communication device includes a bar-type housing and a flip part pivotably attached to the housing, and the folder-type communication device includes a bar-type housing and a folder part pivotably attached to the housing.

On the basis of how they are opened or closed, the portable communication devices may be further classified into a rotating-type communication device and a sliding-type communication device. The rotating-type communication device is characterized in that two housings are rotatably connected to each other while the housings are continuously opposite to each other. The rotating-type communication device is opened or closed by the rotation of the two housings in such a manner that the housings are rotated apart from or towards each other. On the other hand, the sliding-type communication device is characterized in that two housings slide in the longitudinal direction. The sliding-type communication device is opened or closed by sliding movement of the two housings in such a manner that the housings are slid apart from or towards each other. The above-mentioned various types of communication devices will be easily appreciated by a person of ordinary skill in the art to which the present invention pertains.

An increasing trend provides a camera lens module in each portable communication device to transmit image signals. The camera lens module is mounted outside or inside a main body of the portable communication device so that a user of the device can talk with another user of a similar device while looking at each other, or take pictures of his/her desired subjects.

However, the camera lens module provided in the conventional portable communication device is typically not properly protected from the environment which may result in the introduction of foreign matter into a camera lens. Specifically, the camera lens module is constantly exposed to the environment, and therefore the camera lens module is easily contaminated or damaged without using an additional protecting unit.

In order to overcome the above-mentioned problem, a camera lens module retracting/extending apparatus has been adopted in a mobile communication terminal, which is capable of retracting/extending the camera lens module into/from the mobile communication terminal in a one-touch manner. In this conventional camera lens module retracting/extending apparatus, however, the camera lens module is provided with resilient means, making it necessary for the user to manually push the camera lens module, sometimes several times, in one direction. Consequently, the conventional camera lens module retracting/extending apparatus is not convenient to use. Furthermore, the resilient force of the resilient means decreases over time as the resilient means is repetitively pushed resulting in improper function of the retracting/extending operation of the camera lens module.

SUMMARY OF THE INVENTION

Therefore, the present invention has been made in view of the above problem, and it is an object of the present invention to provide an automatic camera lens module retracting/extending apparatus for mobile communication terminals that is capable of converting rotating movement of a driving motor into rectilinear movement to automatically retract/extend a camera lens module into/from a mobile communication terminal, thereby improving convenience of use.

It is another object of the present invention to provide an automatic camera lens module retracting/extending apparatus for mobile communication terminals that is capable of converting rotating movement of a driving motor into rectilinear movement to automatically retract/extend a camera lens module into/from a mobile communication terminal, thereby protecting the camera lens module in the mobile communication terminal when the camera lens module is not in use, and preventing foreign matter from being introduced into the camera lens module.

In accordance with the present invention, the above and other objects can be accomplished by the provision of an automatic camera lens module retracting/extending apparatus for mobile communication terminals, including a lens housing extending a predetermined length in the longitudinal direction thereof; and a lens cam assembly to accommodate the lens housing therein, the lens cam assembly converting rotating movement of a driving motor into rectilinear movement to automatically retract/extend the lens housing into/from the lens cam assembly in the longitudinal direction of the lens housing, wherein the lens housing is automatically rotated about a rotating axis of the lens housing by means of the lens cam assembly when the lens housing extends from the lens cam assembly.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, a preferred embodiment of the present invention will be described in detail with reference to the accompanying drawings.

Referring to FIGS. 1 to 11, an automatic camera lens module retracting/extending apparatus 10 includes a lens housing 20 and a lens cam assembly 30. The lens housing 20 extends a predetermined length in the longitudinal direction thereof, and the lens housing 20 is accommodated in the lens cam assembly 30. The lens cam assembly 30, which accommodates the lens housing 20 therein, converts rotating movement of a driving motor 33 into rectilinear movement to automatically retract/extend the lens housing 20 into/from the lens cam assembly 30 in the longitudinal direction of the lens housing 20. The lens housing 20 is automatically rotated about a rotating axis A1 of the lens housing 20 by means of the lens cam assembly 30 when the lens housing 20 is extends from the lens cam assembly 30.

Figure 1:
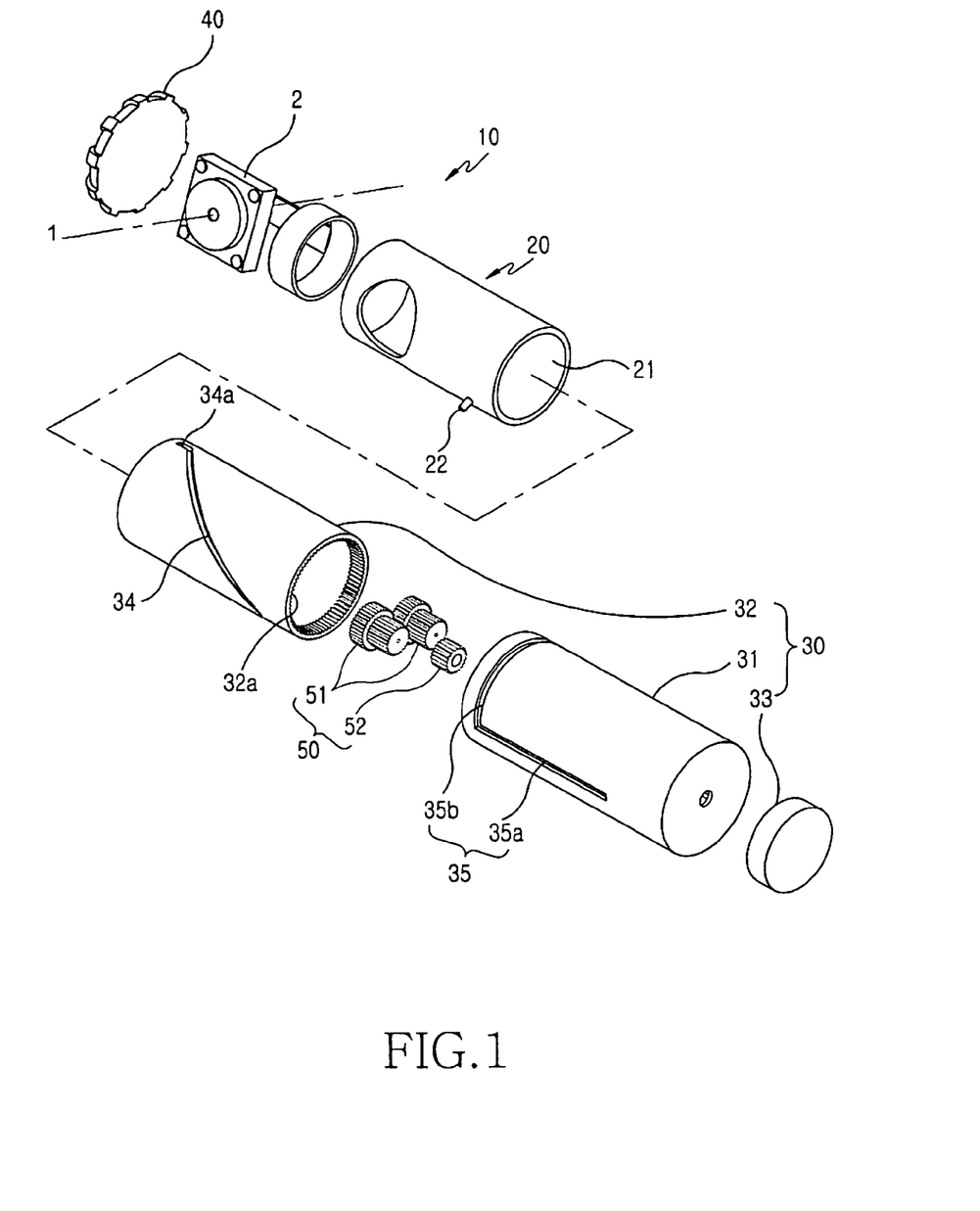
FIG. 1 is an exploded perspective view of an automatic camera lens module retracting/extending apparatus for mobile communication terminals according to a preferred embodiment of the present invention.

Also, the lens housing 20 is preferably formed in the shape of a cylinder. In the lens housing 20 is defined an accommodating space 21 for accommodating a camera lens module 2. The camera lens module 2 has an optical axis O1 perpendicular to the longitudinal direction of the lens housing 20. The camera lens module 2 is securely fixed to one end of the lens housing 20, at which a lens cover 40 to close the lens housing 20 is disposed. The lens cam assembly 30 includes a slide cam 31, a rotary cam 32, and a driving motor 33. The slide cam 31 has an open end, through which the lens housing 20 can be slid. The driving motor 33 is attached to the other end of the slide cam 31 for rotating the rotary cam 32. The rotary cam 32 is disposed between the slide cam 31 and the lens housing 20 for converting rotating movement of the driving motor 33 into rectilinear movement. The driving motor 33 rotates the rotary cam 32 as electric current is supplied to the driving motor 33.

The lens housing 20 is provided at a predetermined position of the circumference thereof with a guide protrusion 22, which extends in the direction perpendicular to the rotating axis A1 of the lens housing 20 such that the guide protrusion 22 can be inserted through a cam hole 34 of the rotary cam 32 and a guide hole 35 of the slide cam 31, which will be described below.

The cam hole 34 is formed in a curved line at the circumference of the rotary cam 32 along the longitudinal direction of the rotary cam 32 such that the guide protrusion 22 can be moved along the cam hole 34, through which the guide protrusion 22 is inserted, as the rotary cam 32 is rotated. The guide hole 35, through which the guide protrusion 22 extending from the cam hole 34 is also inserted, is formed at the slide cam 31 such that the guide protrusion 22 can be linearly moved and rotated along the guide hole 35. At one end of the cam hole 34 is formed at least one stopper hole 34a to stop the movement of the guide protrusion 22.

The guide hole 35 includes first and second guide holes 35a and 35b. The first guide hole 35a is formed in the longitudinal direction of the slide cam 31 such that the guide protrusion 22 can be linearly guided along the first guide hole 35a as the rotary cam 32 is rotated.

The second guide hole 35b is formed at one end of the first guide hole 35a in the circumferential direction of the slide cam 31 such that the guide protrusion 22 can be rotatably guided about the rotating axis A1 of the lens housing 20 when the lens housing 20 extends from the rotary cam 32 and the slide cam 31. Between the rotary cam 32 and the driving motor 33 is disposed a speed-reducing module 50, by which the rotary cam 32 is engaged with the driving motor 33. The number of rotations of the rotary cam 32 is adjusted by means of the speed-reducing module 50 such that the speed of the rotary cam 32 is reduced. The speed-reducing module 50 includes first and second idle gears 51 and a spur gear 52. The first and second idle gears 51 are engaged with a ring gear 32a formed at the inner circumference of the rotary cam 32. The spur gear 52 is engaged with the first and second idle gears 51, and is connected to the driving motor 33 on the rotating axis A1 of the driving motor 33 such that the first and second idle gears 51 and the ring gear 32a can be rotated by means of the spur gear 52 as the driving motor 33 is rotated.

The operation of the automatic camera lens module retracting/extending apparatus for mobile communication terminals with the above-stated construction according to the preferred embodiment of the present invention will now be described in detail with reference to FIGS. 1 to 11.

Figure 2:
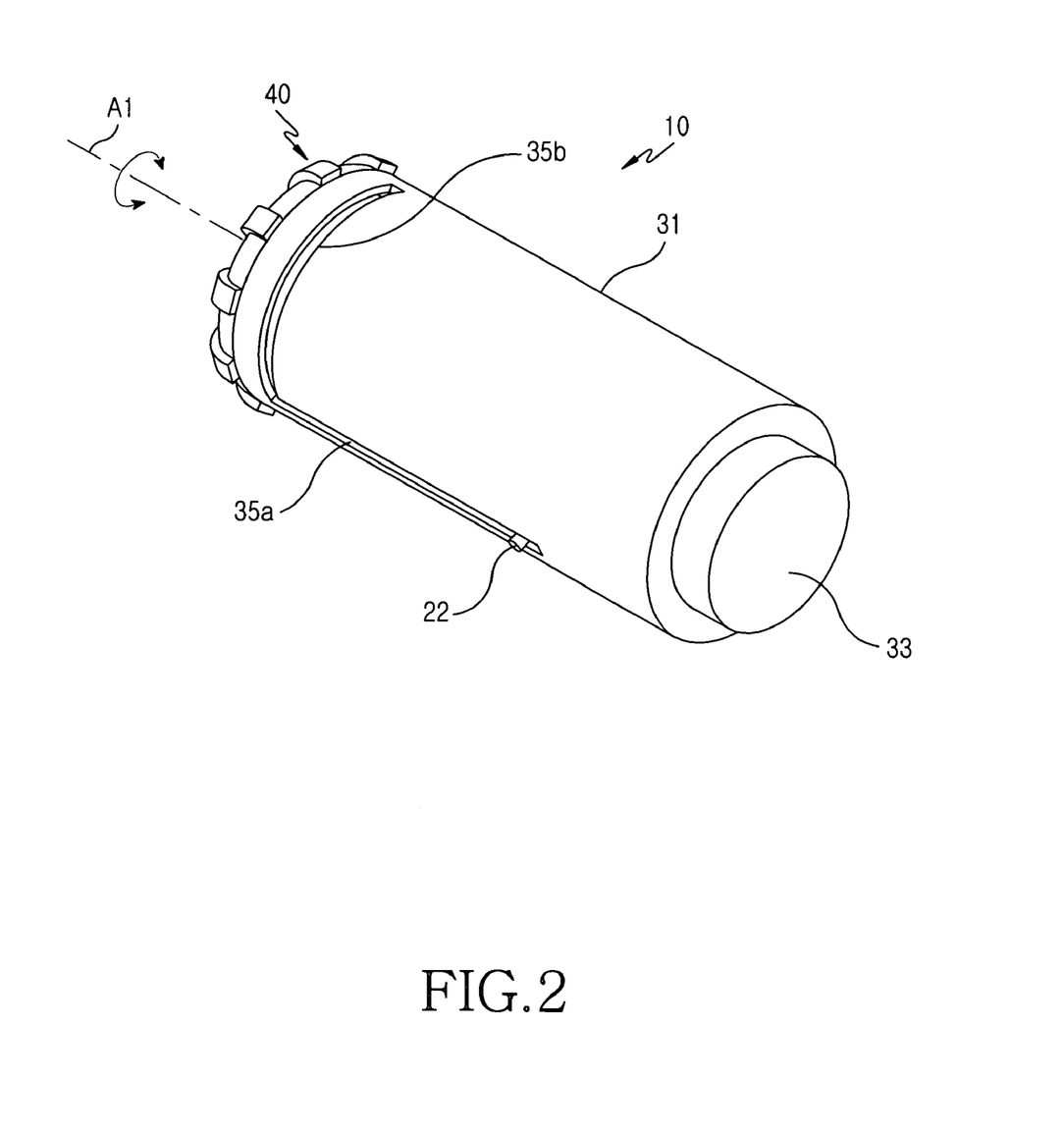
FIG. 2 is an assembled perspective view of the automatic camera lens module retracting/extending apparatus shown in FIG. 1.
Figure 3:
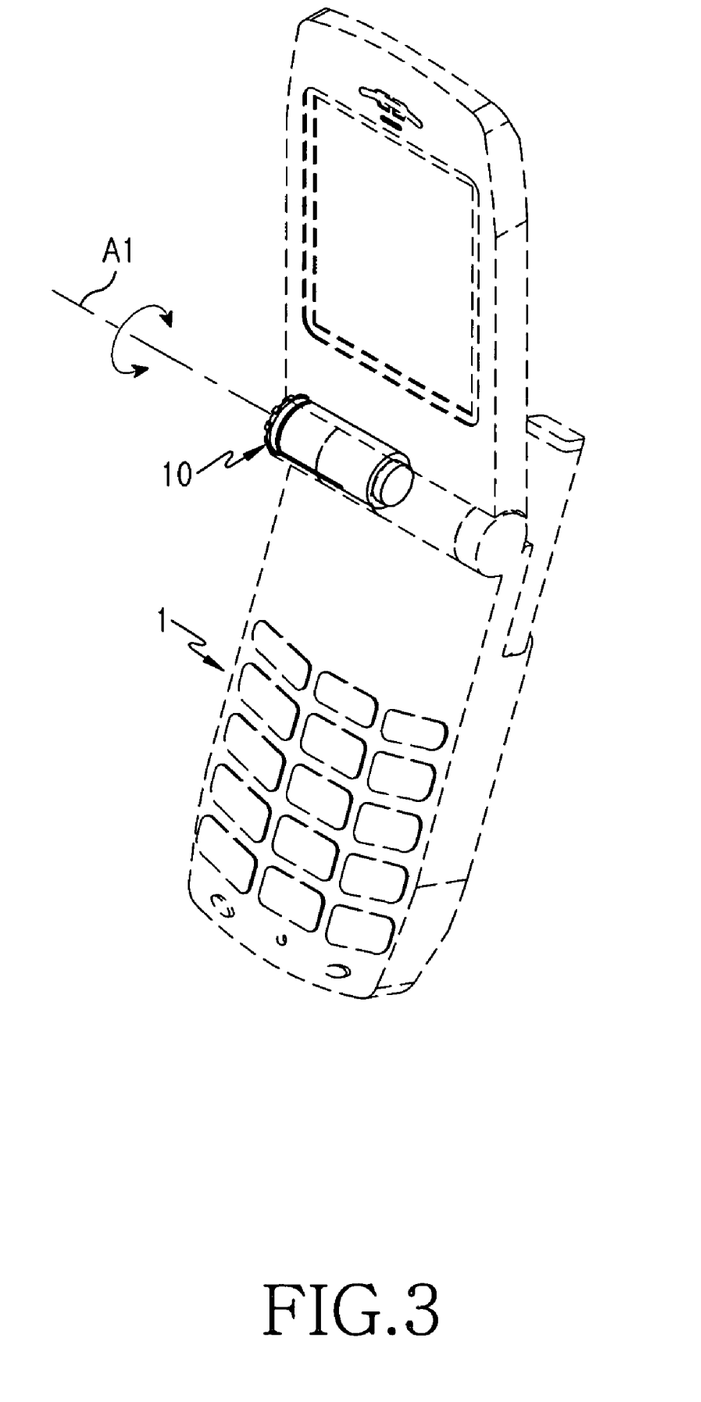
FIG. 3 is a perspective view of the automatic camera lens module retracting/extending apparatus shown in FIG. 2 mounted in a folder-type communication terminal.

As shown in FIGS. 1 to 3, the automatic camera lens module retracting/extending apparatus 10, which includes the lens housing 20, the lens cam assembly 30, and the speed-reducing module 50, is mounted in a terminal body 1 of the mobile communication terminal with the camera lens module 2.

As shown in FIG. 1, the lens housing 20 is formed in the shape of a cylinder, and the accommodating space 21 to accommodate the camera lens module 2 is defined in the lens housing 20. The camera lens module 2 is securely fixed to one end of the lens housing 20, at which the lens cover 40 to close the lens housing 20 is disposed. The lens cam assembly 30 includes the slide cam 31, the rotary cam 32, and the driving motor 33.

The guide protrusion 22 is formed at a predetermined position of the lens housing 20 while extending in the direction perpendicular to the rotating axis A1 of the lens housing 20. Consequently, the lens housing 20 is fitted into the rotary cam 32 while the guide protrusion 22 is inserted through the cam hole 34 formed at the rotary cam 32. The rotary cam 32 is rotatably inserted into the slide cam 31.

Figure 4:
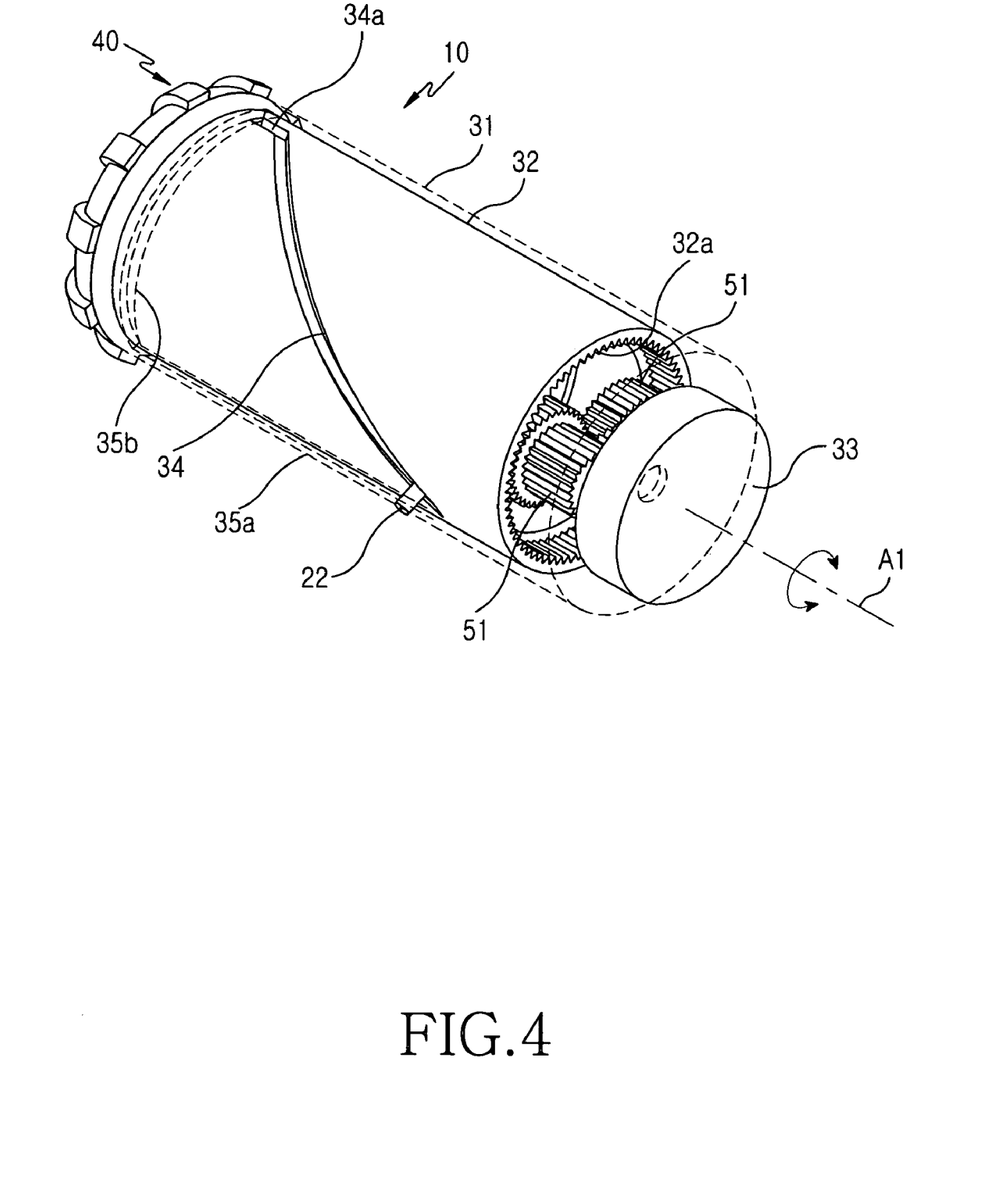
FIG. 4 is a perspective view of the automatic camera lens module retracting/extending apparatus shown in FIG. 2 before the automatic camera lens module retracting/extending apparatus is operated.
Figure 5:
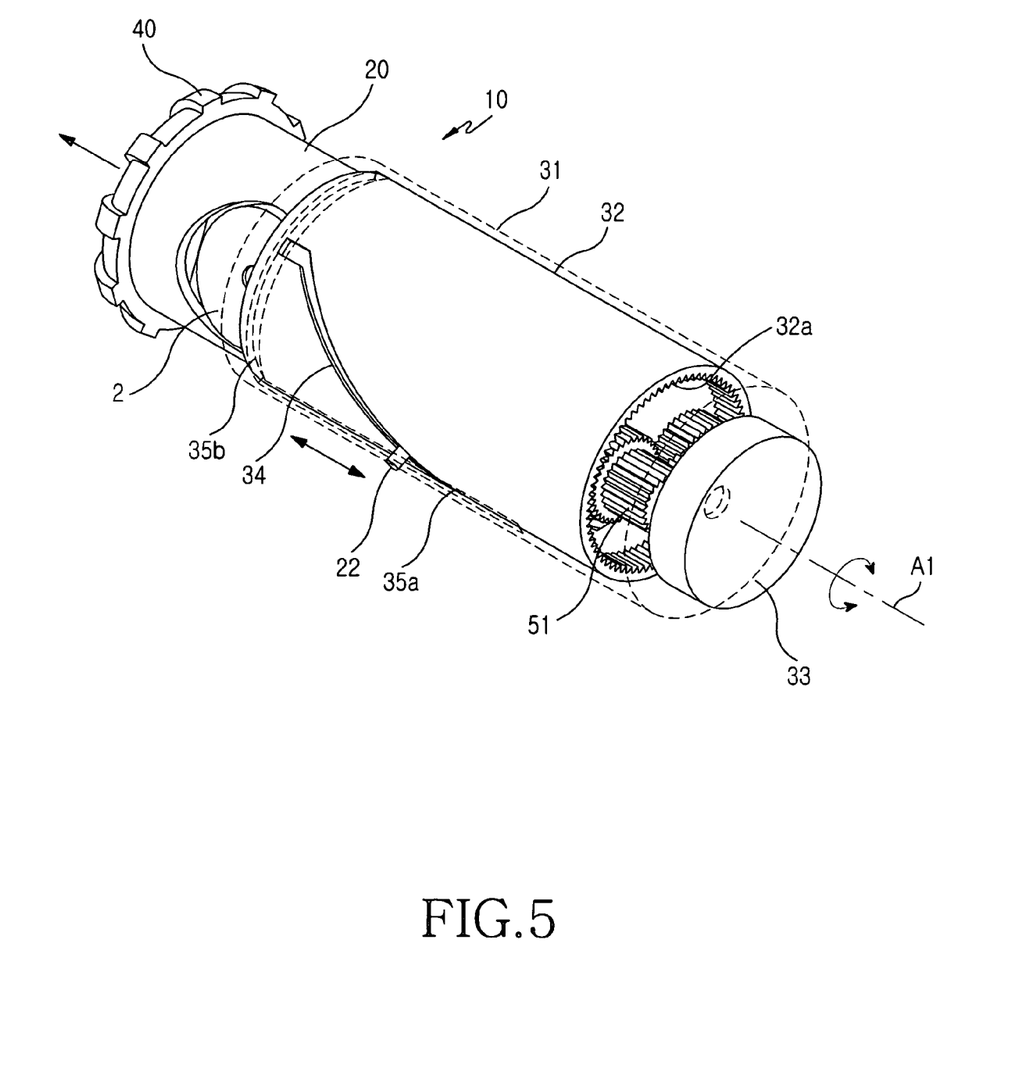
FIG. 5 is a perspective view showing rotation of a rotary cam of the automatic camera lens module retracting/extending apparatus shown in FIG. 2.
Figure 6:
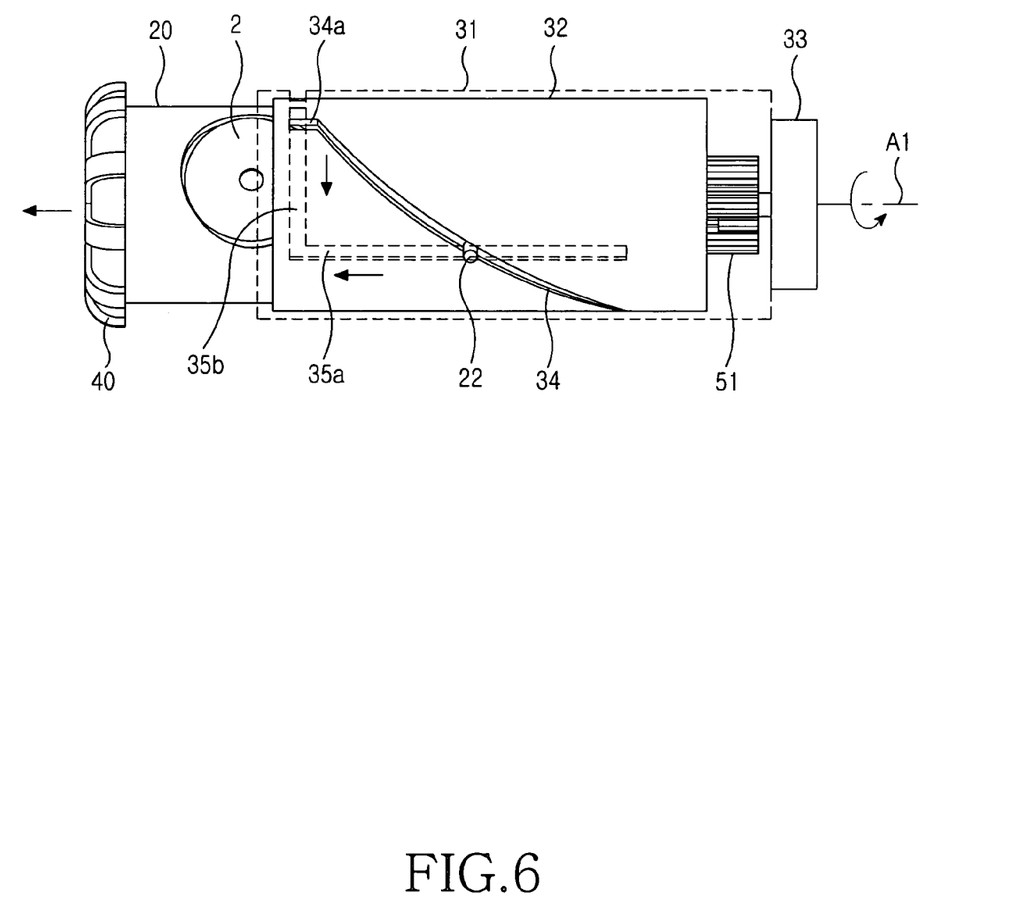
FIG. 6 is a side view of the automatic camera lens module retracting/extending apparatus shown in FIG. 5.

At this time, the guide protrusion 22 extending from the cam hole 34 of the rotary cam 32 is inserted through the first guide hole 35a of the slide cam 31, as shown in FIG. 1. The ring gear 32a, which is formed at the inner circumference of one end of the rotary cam 32, is engaged with the first and second idle gears 51 of the speed-reducing module 50. The first and second idle gears 51 are engaged with the spur gear 52, which is connected to the driving motor 33 on the rotating axis A1 of the driving motor 33. When electric current is supplied to the driving motor, and thus the driving motor 33 is rotated, as shown in FIG. 4, the spur gear 52 and the first and second idle gears 51 are rotated. Consequently, the ring gear formed at the rotary cam 32 is also rotated. When the rotary cam 32 is rotated as the driving motor 33 is operated, as shown in FIGS. 5 and 6, the guide protrusion 22 of the lens housing 20 is guided along the cam hole 34 of the rotary cam 32 and the first guide hole 35a of the slide cam 31.

Figure 7:
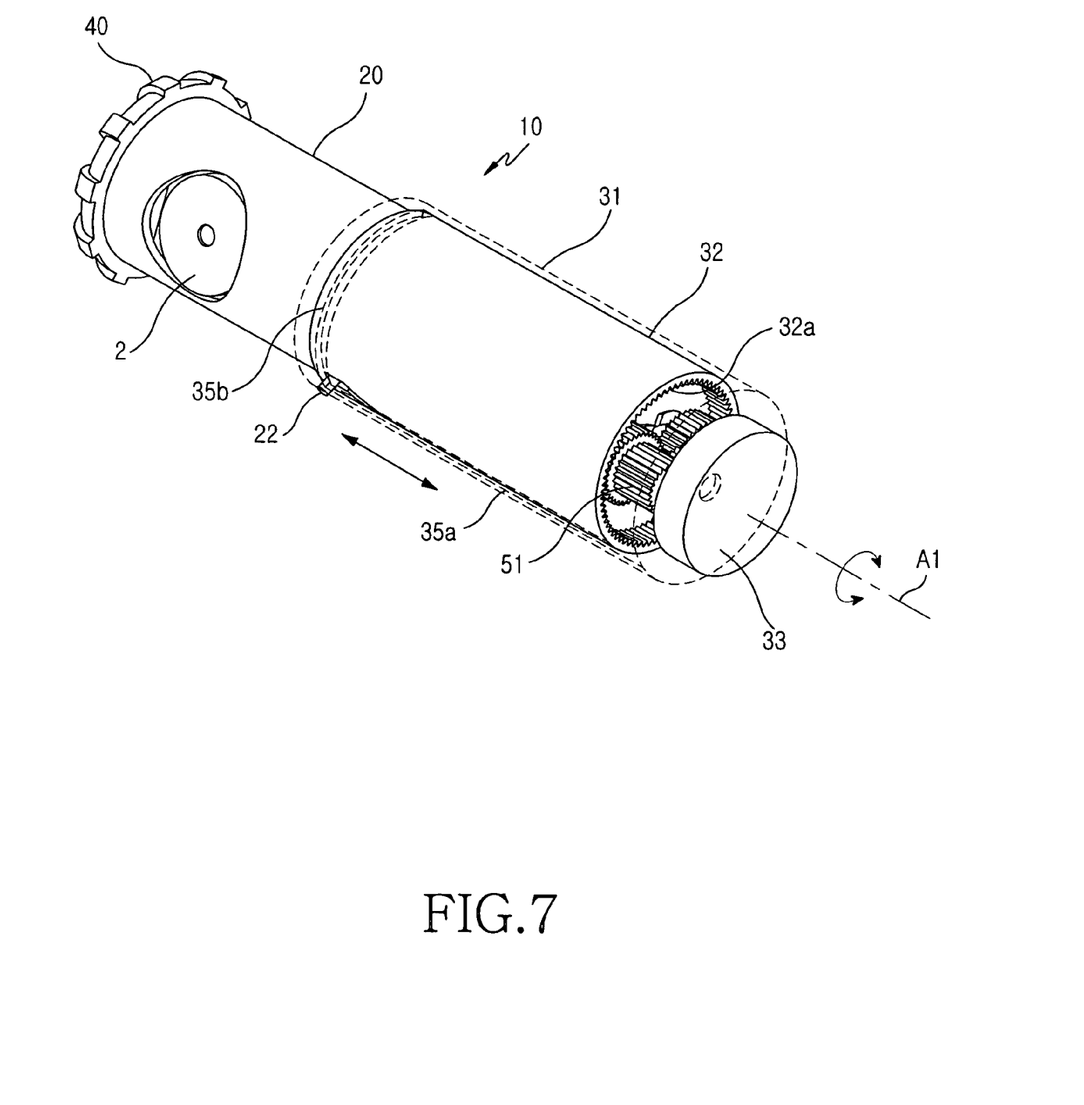
FIG. 7 is a perspective view of the automatic camera lens module retracting/extending apparatus shown in FIG. 2 after the automatic camera lens module retracting/extending apparatus is operated.

The cam hole 34 of the rotary cam 32 is formed in a curved line at the circumference of the rotary cam 32 along the longitudinal direction of the rotary cam 32. Consequently, the guide protrusion 22 is moved along the curved cam hole 34 of the rotary cam 32 with the result that the rotating movement of the driving motor 33 is converted into rectilinear movement. At the same time, the guide protrusion 22 is guided along the first guide hole 35a of the slide cam 31, as shown in FIG. 7, with the result that the lens housing 20 automatically extends from the slide cam 31 and the rotary cam 32.

Figure 8:
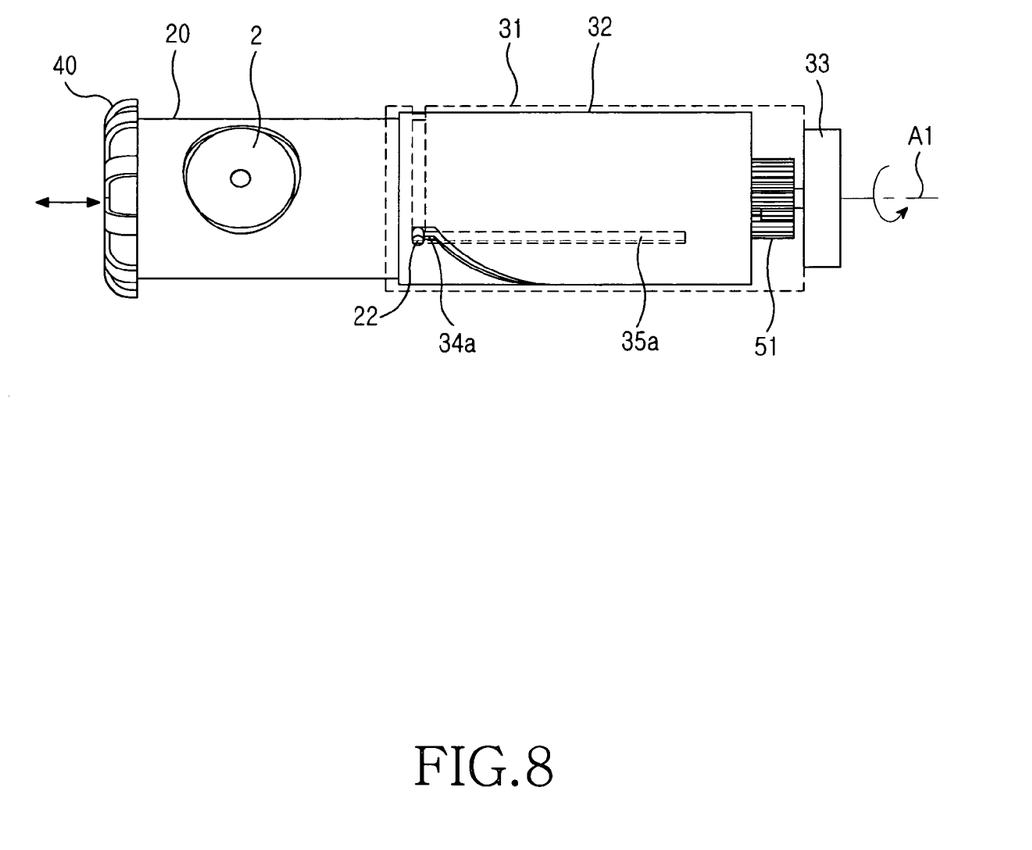
FIG. 8 is a side view of the automatic camera lens module retracting/extending apparatus shown in FIG. 7.

As shown in FIG. 8, the guide protrusion 22 is located in the stopper hole 34a formed at one end of the cam hole 34 with the result that the movement of the guide protrusion 22 is stopped. At the same time, the guide protrusion 22 is moved into the second guide hole 35b formed at one end of the first guide hole 35a.

Figure 9:
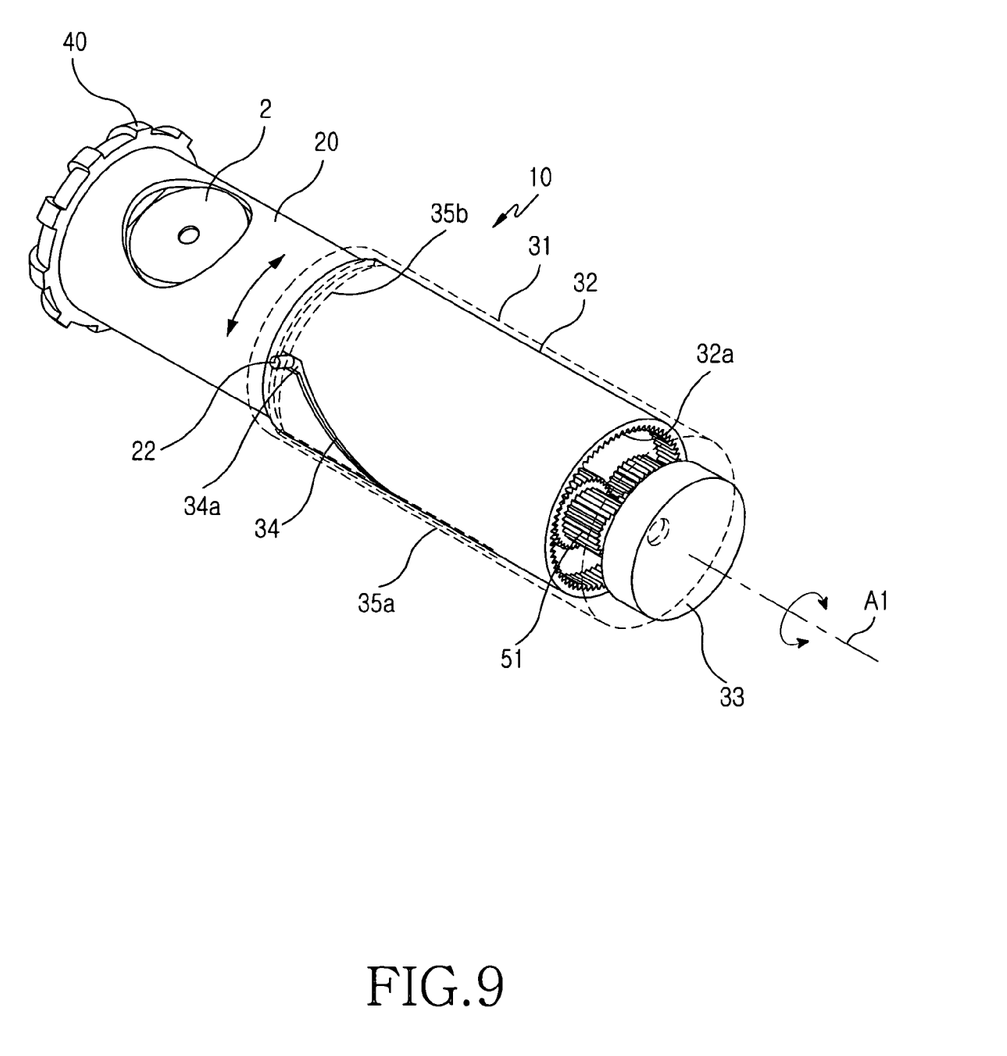
FIG. 9 is a perspective view of the automatic camera lens module retracting/extending apparatus shown in FIG. 2 showing how a lens housing is rotated after the automatic camera lens module retracting/extending apparatus is operated.
Figure 10:
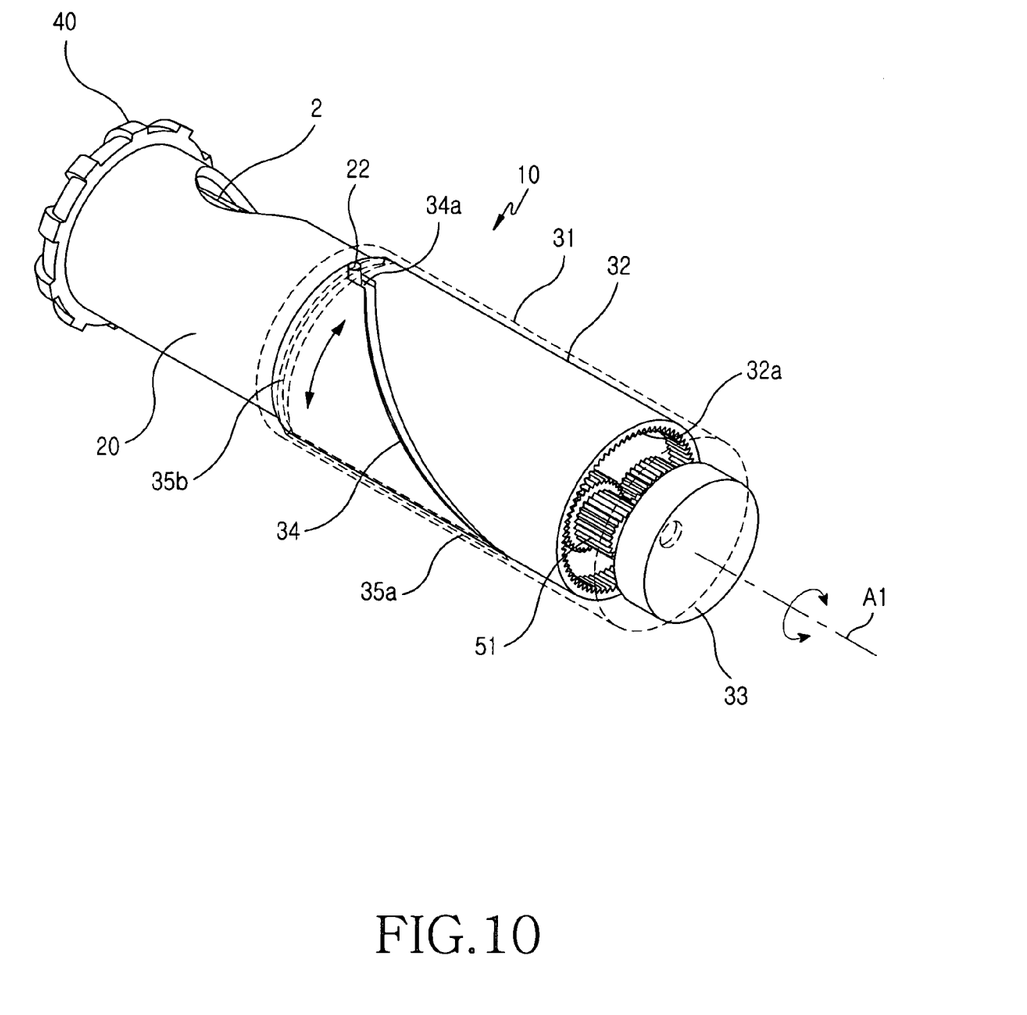
FIG. 10 is perspective view of the automatic camera lens module retracting/extending apparatus shown in FIG. 2 showing the lens housing rotated after the automatic camera lens module retracting/extending apparatus is operated.
Figure 11:
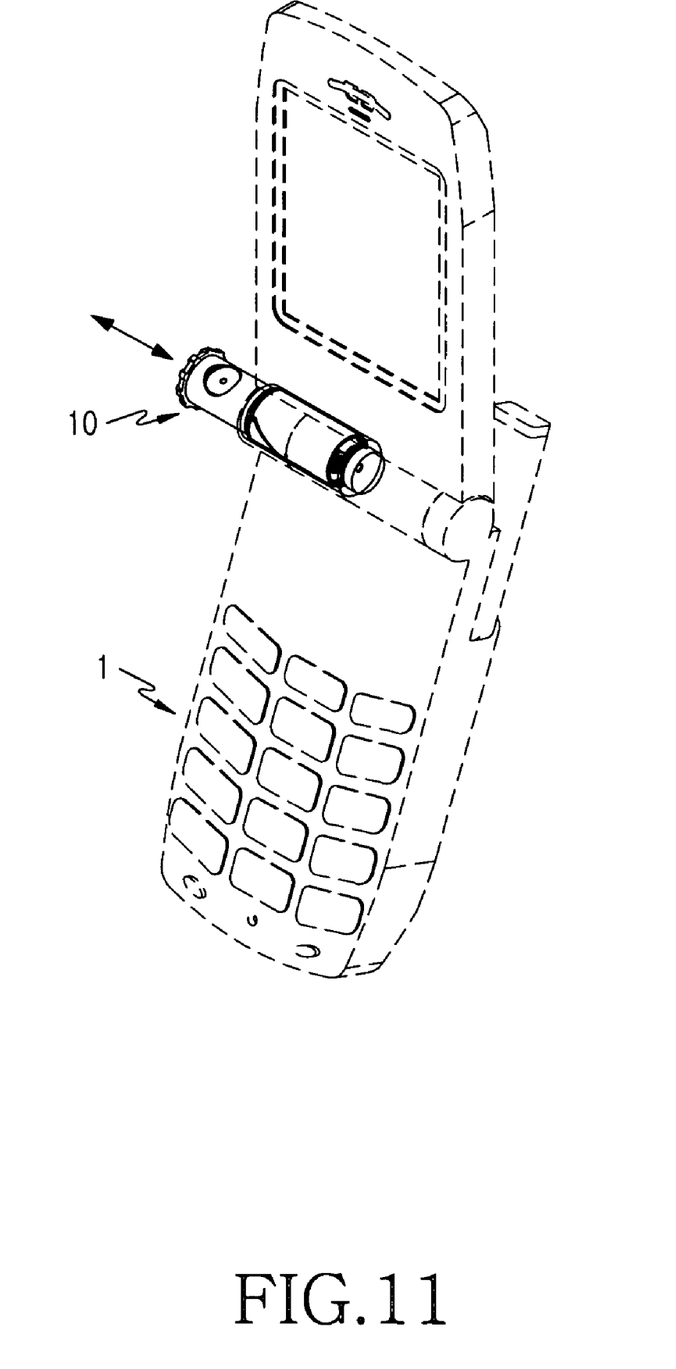
FIG. 11 is a perspective view of the automatic camera lens module retracting/extending apparatus shown in FIG. 2 mounted in a folder-type communication terminal showing the lens housing extending from the automatic camera lens module retracting/extending apparatus.

When the driving motor 33 is operated again, as shown in FIGS. 9 and 10, the rotary cam 32 is rotated, and thus the guide protrusion 22 is guided along the second guide hole 35b. Consequently, the lens housing 20 is rotated about the rotating axis A1 of the lens housing 20. When the lens housing 20 is to be retracted into the slide cam 31 and the rotary cam 32, the driving motor 33 is operated in the reverse direction. As a result, the rotary cam 32 is rotated in the reverse direction, and thus the guide protrusion 22 is guided along the second guide hole 35b in the opposite direction.

As shown in FIG. 10, the guide protrusion 22 is guided along the second guide hole 35b, and is then moved into the first guide hole 35a. Subsequently, the guide protrusion 22 is guided along the cam hole 34 of the rotary cam 32 and the first guide hole 35a of the slide cam 31. As a result, the rotating movement is converted into rectilinear movement, and thus the lens housing 20 slides. Consequently, the lens housing 20 is fully retracted into the slide cam 31 and the rotary cam 32.

As apparent from the above description, the present invention provides a camera lens module retracting/extending apparatus for mobile communication terminals that is capable of converting rotating movement of a driving motor into rectilinear movement to automatically retract/extend a camera lens module into/from a mobile communication terminal, thereby improving convenience of use, protecting the camera lens module in the mobile communication terminal when the camera lens module is not in use, and preventing foreign matter from being introduced into the camera lens module.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An automatic camera lens module retracting and extending apparatus for a mobile communication terminal having a camera lens module, comprising:
    a lens module defining an optical axis;
    a lens housing extending a predetermined length in a longitudinal direction thereof and perpendicular to the optical axis; and
    a lens cam assembly to accommodate the lens housing therein, the lens cam assembly converting rotating movement of a driving motor into rectilinear movement to automatically retract and extend the lens housing into and out of the lens cam assembly in the longitudinal direction of the lens housing, wherein the lens housing automatically rotates when the lens housing extends from the lens cam assembly.

2. The apparatus as set forth in claim 1, wherein the lens housing is formed in the shape of a cylinder, and the lens housing has an accommodating space defined therein for accommodating the camera lens module.

3. The apparatus as set forth in claim 1, further comprising a lens cover fixed to one end of the lens housing for closing the lens housing.

4. The apparatus as set forth in claim 1, wherein the lens cam assembly comprises:
    a slide cam having one end opened for allowing the lens housing to be slid therethrough and an other end for allowing the driving motor to be attached thereto; and
    a rotary cam disposed between the slide cam and the lens housing for converting rotating movement of the driving motor into rectilinear movement, whereby the driving motor rotates the rotary cam as electric current is supplied to the driving motor.

5. The apparatus as set forth in claim 4, wherein
    the lens housing is provided at a predetermined position of the circumference thereof with a guide protrusion extending in a direction perpendicular to a rotating axis of the lens housing,
    the rotary cam is provided at the circumference thereof along a longitudinal direction thereof with a cam hole, formed in a curved line, for guiding the guide protrusion while the guide protrusion is inserted through the curved cam hole, and the slide cam is provided with at least one guide hole for guiding the guide protrusion such that the guide protrusion can be linearly moved and rotated within the guide hole while the guide protrusion extends through the cam hole.

6. The apparatus as set forth in claim 5, wherein the cam hole is provided at one end thereof with at least one stopper hole for stopping the movement of the guide protrusion.

7. The apparatus as set forth in claim 6, wherein the guide hole comprises:

a first guide hole formed in a longitudinal direction of the slide cam; and a second guide hole formed at one end of the first guide hole in a circumferential direction of the slide cam.

8. The apparatus as set forth in claim 7, wherein when the rotary cam is rotated by means of the driving motor, the guide protrusion of the lens housing is guided along the cam hole of the rotary cam and the first guide hole of the slide cam such that the lens housing can be automatically retracted and extended into and away from the rotary cam and the slide cam, and when the lens housing extends from the rotary cam and the slide cam, the guide protrusion of the lens housing is moved into the stopper hole such that the movement of the guide protrusion is stopped, and simultaneously the guide protrusion is moved into the second guide hole of the slide cam such that the guide protrusion is rotated about the rotating axis of the lens housing.

9. The apparatus as set forth in claim 4, further comprising a speed-reducing module disposed between the rotary cam and the driving motor such that the rotary cam is engaged with the driving motor by means of the speed-reducing module for adjusting the number of rotations of the rotary cam such that the speed of the rotary cam is reduced, wherein the speed-reducing module includes a plurality of gears.

* * * * *